United States Patent
Hong

(10) Patent No.: US 10,951,330 B2
(45) Date of Patent: Mar. 16, 2021

(54) METHOD FOR CALIBRATION AND APPARATUS THEREFOR

(71) Applicant: Samsung Electronics Co., Ltd., Gyeonggi-do (KR)

(72) Inventor: Seongbeom Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/618,208

(22) PCT Filed: May 28, 2018

(86) PCT No.: PCT/KR2018/006035
§ 371 (c)(1),
(2) Date: Nov. 29, 2019

(87) PCT Pub. No.: WO2018/221910
PCT Pub. Date: Dec. 6, 2018

(65) Prior Publication Data
US 2020/0119818 A1    Apr. 16, 2020

(30) Foreign Application Priority Data
May 31, 2017   (KR) .................. 10-2017-0067418

(51) Int. Cl.
H04B 17/00   (2015.01)
H04B 1/40    (2015.01)
H04B 1/30    (2006.01)
H04B 17/21   (2015.01)
H04B 17/14   (2015.01)
H04B 17/309  (2015.01)
H04B 1/44    (2006.01)

(52) U.S. Cl.
CPC ............... H04B 17/21 (2015.01); H04B 1/44 (2013.01); H04B 17/14 (2015.01); H04B 17/309 (2015.01)

(58) Field of Classification Search
None
See application file for complete search history.

(56) References Cited

U.S. PATENT DOCUMENTS 6,272,322 B1 *  8/2001  Su .................. H04B 17/309
                                              455/67.14
7,130,589 B2 * 10/2006  Lee ................ H04B 17/0085
                                              455/67.11
9,065,537 B2 *  6/2015  Georgantas .......... H04B 1/40
9,106,502 B2 *  8/2015  Teplitsky ........... H04L 27/3863
(Continued)

FOREIGN PATENT DOCUMENTS

KR   10-2015-0115941 A   10/2015

*Primary Examiner* — Tuan A Tran
(74) *Attorney, Agent, or Firm* — Cha & Reiter, LLC

(57) ABSTRACT

The present invention relates to calibration of an electronic device. An operation method of an electronic device may comprise the operations of: setting a first path for a first calibration of a transmission path; performing the first calibration of the transmission path by using the first path; setting a second path for a second calibration of a transceiving path; performing the second calibration of the transceiving path by using the second path; and generating data indicating a result of calibration of a reception path, on the basis of a result obtained by the first calibration and the second calibration. Various other embodiments are possible.

20 Claims, 20 Drawing Sheets

(56) References Cited

U.S. PATENT DOCUMENTS

| | | | |
|---|---|---|---|
| 9,236,998 B2 * | 1/2016 | Wang | H04L 5/1461 |
| 9,338,664 B2 * | 5/2016 | Tenbroek | H04B 17/12 |
| 9,444,559 B2 * | 9/2016 | Jiang | H04B 17/21 |
| 9,531,428 B2 * | 12/2016 | Hsu | H04B 17/104 |
| 2001/0016505 A1 | 8/2001 | Rexberg et al. | |
| 2004/0198340 A1 * | 10/2004 | Lee | H04B 17/21 |
| | | | 455/423 |
| 2014/0226511 A1 | 8/2014 | Gotman | |
| 2014/0233618 A1 * | 8/2014 | Krishnan | H04B 17/14 |
| | | | 375/222 |
| 2014/0341263 A1 * | 11/2014 | Wu | H04B 17/14 |
| | | | 375/224 |
| 2015/0050894 A1 * | 2/2015 | Murakami | H04B 17/14 |
| | | | 455/67.14 |
| 2015/0118970 A1 * | 4/2015 | Thoukydides | H04B 17/21 |
| | | | 455/67.14 |
| 2015/0118980 A1 * | 4/2015 | Leung | H04B 1/38 |
| | | | 455/114.2 |
| 2015/0139046 A1 * | 5/2015 | Wang | H04B 1/10 |
| | | | 370/278 |
| 2015/0180594 A1 | 6/2015 | Chakraborty et al. | |
| 2015/0333779 A1 | 11/2015 | Itkin et al. | |
| 2016/0212677 A1 * | 7/2016 | Chakraborty | H04W 40/02 |
| 2016/0261303 A1 * | 9/2016 | Hsu | H04B 1/44 |
| 2017/0033454 A1 | 2/2017 | van Bezooijen et al. | |

* cited by examiner

METHOD FOR CALIBRATION AND APPARATUS THEREFOR

CROSS REFERENCE TO RELATED APPLICATIONS

This application is a National Phase Entry of PCT International Application No. PCT/KR2018/006035, which was filed on May 28, 2018, and claims a priority to Korean Patent Application No. 10-2017-0067418, which was filed on May 31, 2017, the contents of which are incorporated herein by reference.

TECHNICAL FIELD

Various embodiments of the disclosure relate to a method for calibration and an electronic device thereof.

BACKGROUND ART

As the communication environment changes from voice or text-oriented low-capacity data of the past to a high-resolution video requiring high transmission speed, and the like, various wireless communication systems have been studied for securing a higher transmission capacity and efficient use of limited frequency resources. For example, a 5th generation (5G) system, standardization of which is actively progressing in recent years, may use millimeter wave bands (e.g., 6 GHz, 28 GHz, 60 GHz, etc.) to achieve a higher data transmission rate.

As the commercialization of a next-generation system having a higher data transmission rate such as the 5G system progresses, development of transceivers supporting a higher data transmission rate is also required. In order to provide a higher data transmission rate, error vector magnitude (EVM) performance lower than that of a conventional system is required, and in order to satisfy the lower EVM, distortion that occurs while signals are being transferred through the system must be minimized. The distortion of the transceiver eventually causes a decrease in signal-to-noise ratio (SNR) of the signal, and the distortion may mainly occur while passing through an analog circuit, such as a radio frequency (RF) circuit and the like.

DISCLOSURE OF INVENTION

Technical Problem

In general, calibration of a radio frequency (RF) circuit requires connection of a separate measurement equipment for calibration to a transceiver circuit. However, in a device including multiple antennas, the addition itself of measurement equipment may further cause distortion, and may cause great inconvenience due to physical manipulation.

For example, in the case of a millimeter wave band, a beamforming technology may be used to overcome severe path attenuation. In the case where beamforming is performed, a device such as a user equipment (UE) and a base station may use an antenna array including a plurality of antennas. Beamforming may be performed by adjusting the phase and magnitude of signals transmitted/received through the plurality of antennas. At this time, in order to perform accurate beam control, calibration for matching characteristics of corresponding paths to the antenna is required.

Various embodiments of the disclosure provide a method for effectively performing calibration in a device including a plurality of antennas, and an electronic device thereof.

Solution to Problem

An operation method of an electronic device according to various embodiments of the disclosure may include: configuring a first path for a first calibration of a transmission path; performing the first calibration of the transmission path by using the first path; configuring a second path for a second calibration of a transceiving path; performing the second calibration of the transceiving path by using the second path; and generating data indicating a result of calibration of a reception path, on the basis of a result obtained by the first calibration and the second calibration.

An electronic device according to various embodiments of the disclosure may include: a transmission path; a reception path; a path switch circuit configured to configure a path for calibration of the transmission path and the reception path; and a control circuit configured to control the path switch circuit, wherein the control circuit is configured to: configure a first path for a first calibration of the transmission path; perform the first calibration of the transmission path by using the first path; configure a second path for a second calibration of the transceiving path; perform the second calibration of the transceiving path by using the second path; and generate data indicating a result of calibration of a reception path, on the basis of a result obtained by the first calibration and the second calibration.

Advantageous Effects of Invention

A method and an electronic device thereof according to various embodiments may perform calibration of a transmission path by using a feedback circuit, and perform calibration of a reception path by using a calibration value of the transmission path, thereby reducing additional costs for circuit implementation, reducing circuit complexity, and performing accurate calibration.

According to various embodiments of the disclosure, an electronic device may perform calibration of a transmission path in a radio frequency (RF) circuit by using a feedback circuit, and perform calibration of a reception path by using a result obtained by calibration of the transmission path. Since the calibration technique according to various embodiments of the disclosure does not require additional measurement equipment, various problems due to the addition of measurement equipment can be solved.

BEST MODE FOR CARRYING OUT THE INVENTION

Figure 1:
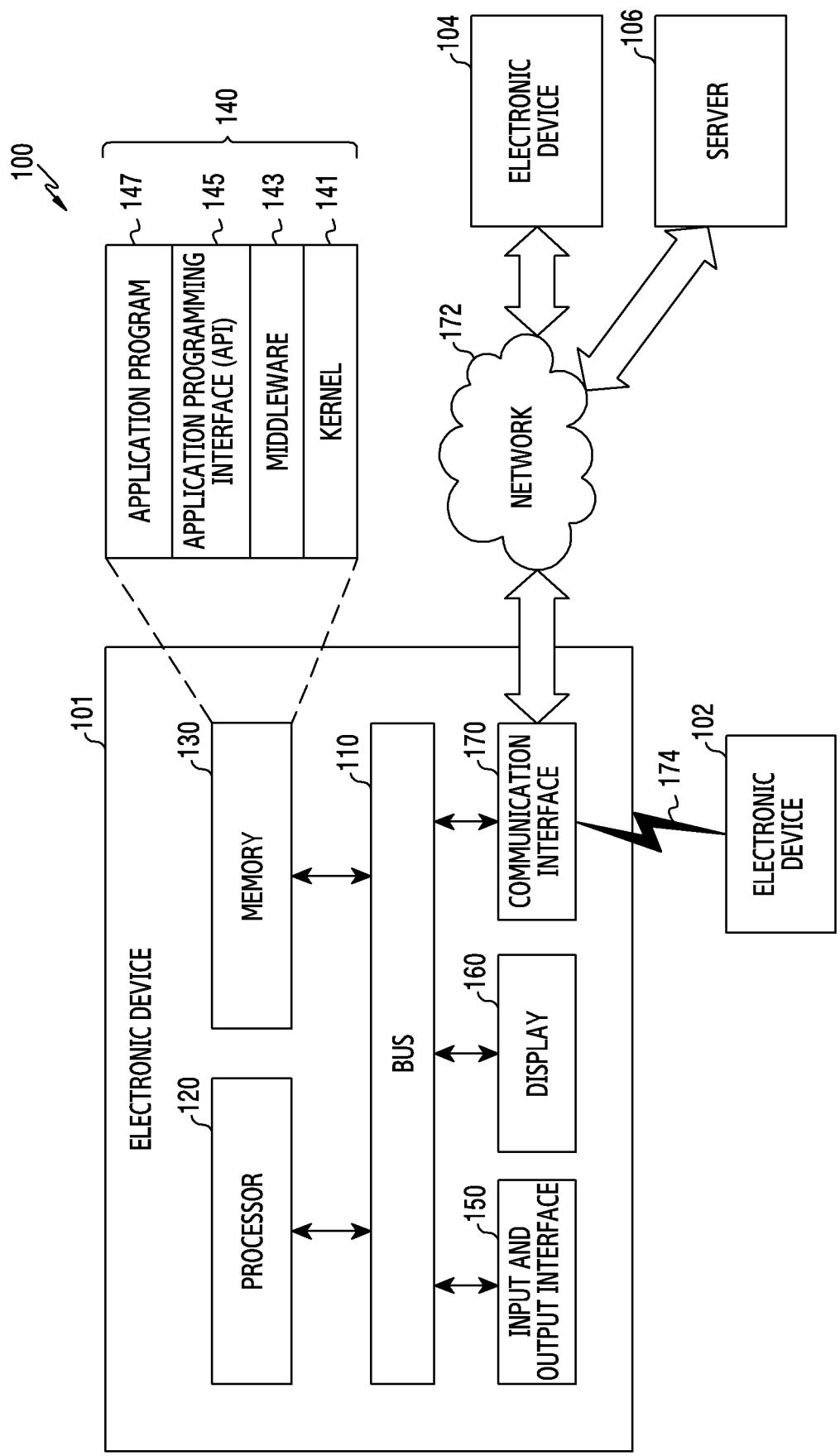
FIG. 1 illustrates an electronic device within a network environment according to various embodiments of the disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. Singular forms may include plural forms as well unless the context clearly indicates otherwise. In the present disclosure, the expression "A or B", "at least one of A or/and B", or "one or more of A or/and B" may include all possible combinations of the items listed. The expression "a first", "a second", "the first", or "the second" used in various embodiments of the present disclosure may modify various components regardless of the order and/or the importance but does not limit the corresponding components. It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them.

In the present disclosure, the expression "configured to" may be exchanged with, for example, "suitable for", "having the capacity to", "adapted to", "made to", "capable of" or "designed to", according to the situation. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a Motion Picture Experts Group-1 audio layer-3 (MP3) player, a medical device, a camera, or a wearable device. The wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), or a bio-implantable circuit. According to some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a global navigation satellite system (GNSS), an Event Data Recorder (EDR), a Flight Data Recorder (FDR), a Vehicle Infotainment Devices, an electronic devices for a ship (e.g., a navigation device for a ship, a gyro-compass, etc.), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). According to various embodiments, the electronic device may be a flexible device. According to various embodiments, the electronic device may be a combination of two or more of the aforementioned various devices. Further, the electronic device according to an embodiment of the present disclosure is not limited to the aforementioned devices. As used herein, the term "user" may indicate a person who uses an electronic device or a device (e.g., an artificial intelligence electronic device) that uses an electronic device.

An electronic device 101 within a network environment 100 in various embodiments of the present disclosure is disclosed by referring to FIG. 1, the electronic device 101 may include a bus 110, a processor 120, a memory 130, an input/output interface 150, a display 160, and a communication interface 170. According to an embodiment, the electronic device 101 may omit at least one of the components or may further include other components. The bus 110 may include, a circuit which interconnects the components 110 to 170 and delivers a communication (e.g., a control message or data) between the components. The processor 120 may include one or more of a Central Processing Unit, an Application Processor, or a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System. The kernel 141 may control or manage system resources (e.g., the bus 110, the processor 120, or the memory 130, and the like) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto. The API 145 is an interface through which the applications 147 control functions provided from the kernel 141 or the middleware 143, and may include, for example, at least one interface or function (e.g., instruction) for file control, window control, image processing, character control, and the like. The input output interface 150 may, for example, forward a command or data inputted from a user or another external device, to another component(s) of the electronic device 101, or may output a command or data received from another component(s) of the electronic device 101, to the user or the other external device.

The display 160 may, for example, include a Liquid Crystal Display (LCD), a Light-Emitting Diode (LED) display, an Organic Light-Emitting Diode (OLED) display, a Micro Electro Mechanical Systems (MEMS) display, and an electronic paper display. The display 160 may display, for example, various types of contents (e.g., text, images, videos, icons, or symbols) to users. The display 160 may include a touch screen, and receive, for example, a touch, gesture, proximity, or hovering input using an electronic pen or a user's body part through the touch screen. The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), or Global System for Mobile Communications (GSM), as a cellular communication protocol. In addition, the wireless communication may include, for example, short range communication 164.

According to an embodiment, the wireless communication may include at least one of, for example, wireless fidelity (Wi-Fi), light fidelity (Li-Fi), Bluetooth, Bluetooth low energy (BLE), Zigbee, Near Field Communication (NFC), magnetic secure transmission, Radio Frequency (RF), or body area network (BAN). According to an embodiment, the wireless communication may include Global Navigation Satellite System (GNSS). GNSS may include, for example, at least one of global positioning system (GPS), global navigation satellite system (Glonass), Beidou Navigation satellite system (Beidou) or the European global satellite-based navigation system (Galileo). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a power line communication or a Plain Old Telephone Service (POTS). The network 172 may include at least one of a telecommunication network such as a computer network (e.g., a LAN or a WAN), the Internet, or a telephone network.

Each of the first and second external electronic devices 102 and 104 may be of a type identical to or different from that of the electronic device 101. According to various embodiments, all or some of the operations performed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
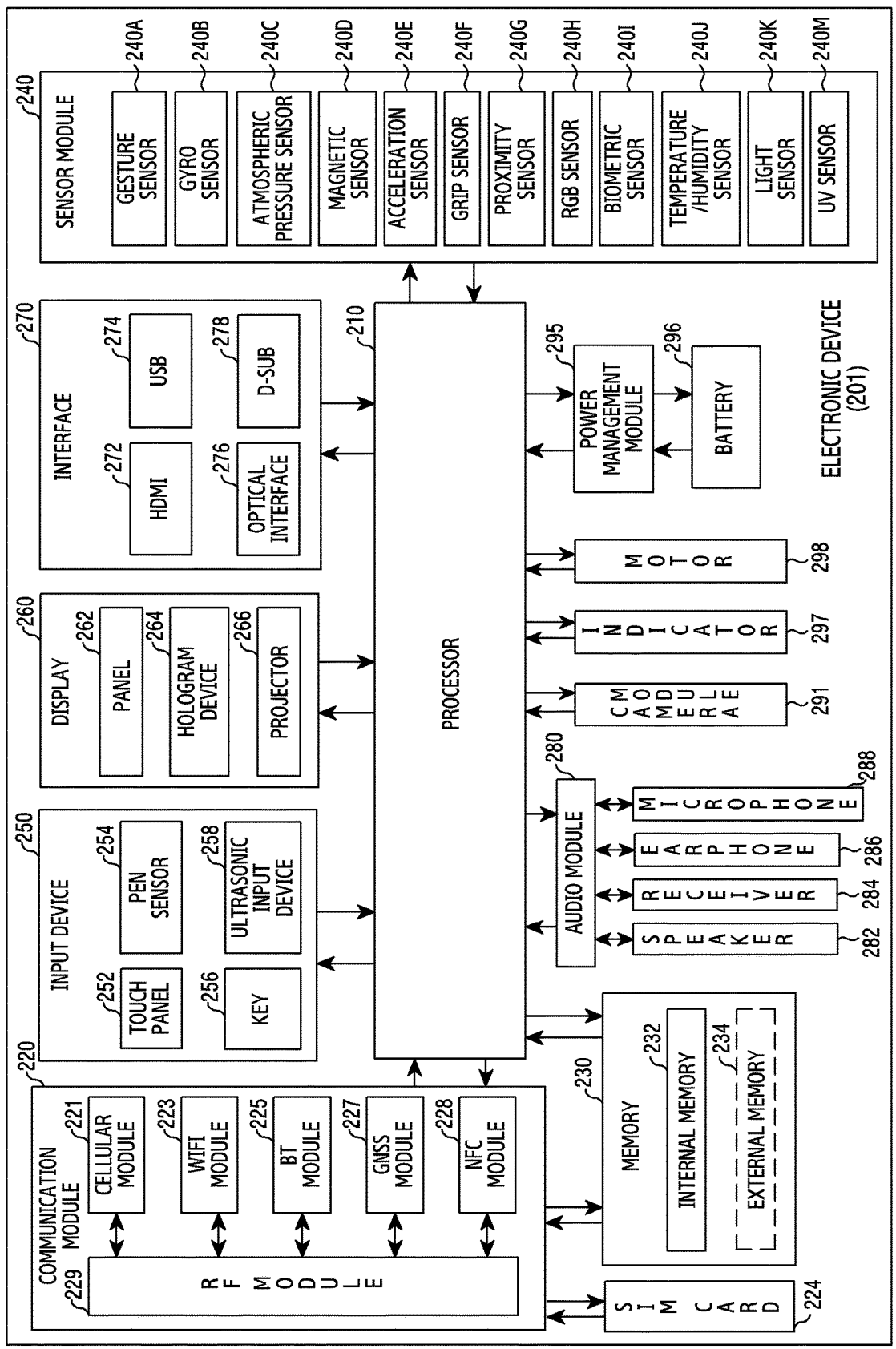
FIG. 2 is a block diagram of an electronic device according to various embodiments of the disclosure.

FIG. 2 is a block diagram of an electronic device 201 according to various embodiments. The electronic device 201 may include, for example, all or a part of the electronic device 101 shown in FIG. 1. The electronic device 201 may include one or more processors 210 (e.g., Application Processors (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor (ISP). The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store result data in a non-volatile memory.

The communication module 220 (e.g., communication interface 170) may have a configuration equal or similar to. The communication module 220 may include, for example, a cellular module 221, a Wi-Fi module 223, a BT module 225, a GNSS module 227, an NFC module 228, and a Radio Frequency (RF) module 229. The cellular module 221, for example, may provide a voice call, a video call, a text message service, or an Internet service through a communication network. According to an embodiment, the cellular module 221 may distinguish and authenticate the electronic device 201 in a communication network using a subscriber identification module (e.g: SIM card) 224. According to an embodiment, the cellular module 221 may perform at least some of the functions that the processor 210 may provide. According to an embodiment, the cellular module 221 may include a communication processor (CP). According to an embodiment, at least some (e.g., two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), or an antenna. According to various embodiments of the disclosure, RF module 229 may include a plurality of RF chains. For example, RF module 229, may include a plurality of RF chains for beamforming or multi-stream transmission. An RF chain may be referred as an 'RF path', a transceiving path' or another term having a same technical meaning of them. According to another embodiment, at least one of the cellular module 221, the WIFI module 223, the BT module 225, the GNSS module 227, or the NFC module 228 may transmit/receive an RF signal through a separate RF module. The subscriber identification module 224 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, or the like. The external memory 234 may be functionally or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 2401, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user. the (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. According to an embodiment, the panel 262 may include a pressure sensor (or a force sensor) capable of measuring an intensity of pressure to a touch of a user. The pressure sensor may be implemented integrally with the touch panel 252, or one or more sensors separately with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp). The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or media-FLO™. Each of the above-described component elements of hardware according to the present disclosure may be configured with one or more components, and the names of the corresponding component elements may vary based on the type of electronic device. In various embodiments, the electronic device (e.g., the electronic device 201) may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
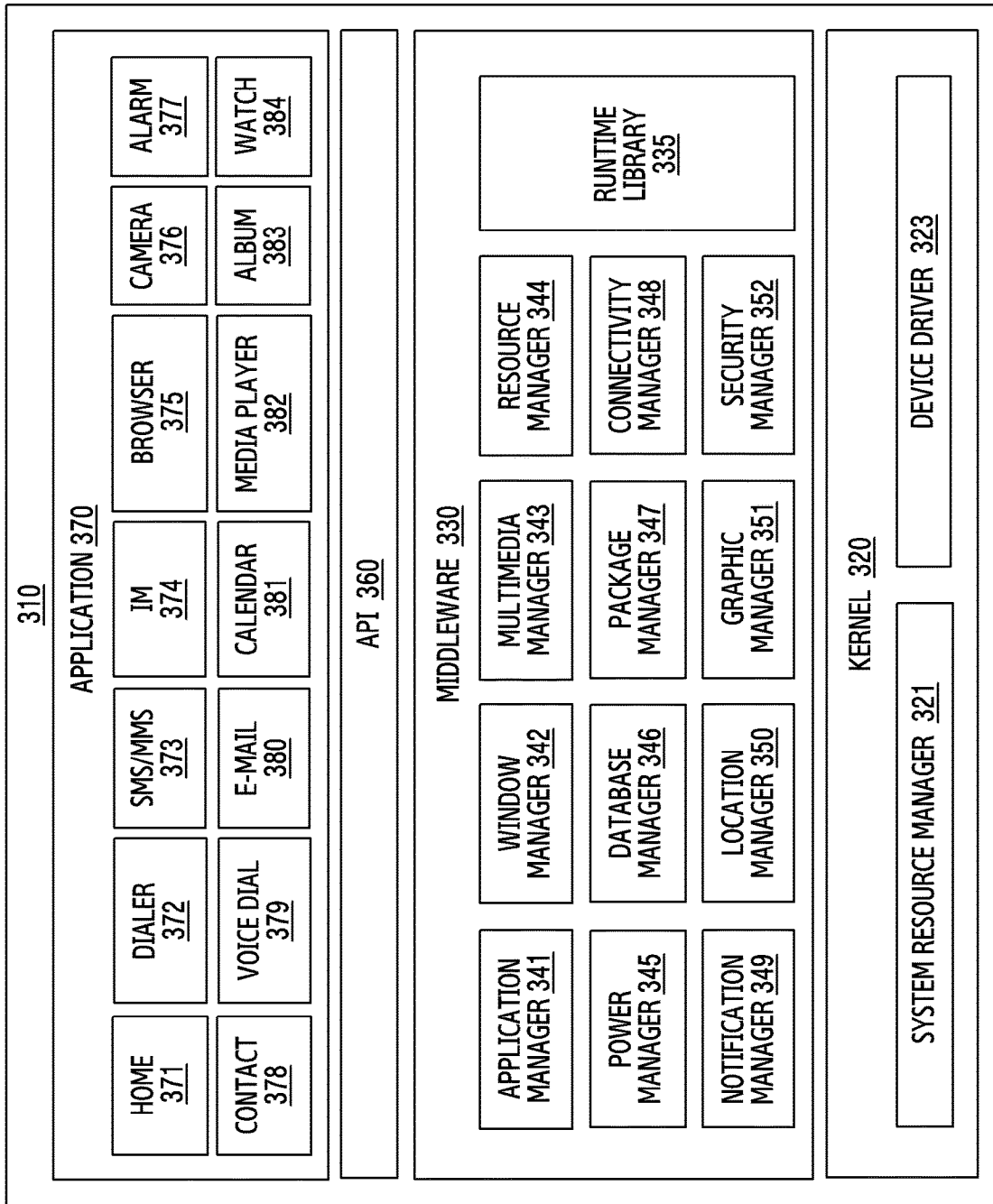
FIG. 3 is a block diagram of a program module according to various embodiments of the disclosure.

FIG. 3 is a block diagram of a program module according to various embodiments. According to an embodiment, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or applications 370 (e.g., the application program 147). At least some of the program module 310 may be preloaded on an electronic device, or may be downloaded from an external electronic device (e.g., the electronic device 102 or 104, or the server 106).

The kernel 320 may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 330 may provide a function required in common by the applications 370, or may provide various functions to the applications 370 through the API 360 so as to enable the applications 370 to efficiently use the limited system resources in the electronic device. According to an embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like. The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370. The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage, for example, wireless connectivity. The notification manager 349 may display or notify of an event such as an arrival message, promise, proximity notification, and the like. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment, the middleware 330 may include a telephony manager for managing a voice call function or a video call function of the electronic device. The middleware 330 may include a middleware module that forms a combination of various functions of the above-described components. According to an embodiment, the middleware 330 may provide a module specialized for each type of OS. Further, the middleware 330 may dynamically remove some of the existing components or add new components. The API 360 is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information). According to an embodiment of the present disclosure, the applications 370 may include an information exchange application that supports exchanging information between the electronic device and an external electronic device. The information exchange application may include, for example, a notification relay application for transferring specific information to an external electronic device or a device management application for managing an external electronic device. The notification relay application may deliver notification information generated from another application of the electronic device to an external electronic device. The notification relay application may receive notification information from, for example, the external electronic device and provide the received notification information to a user. The device management application may install, delete, or update, for example, a function of an external electronic device communicating with the electronic device (e.g., a function of turning on/off the external electronic device itself (or some components) or a function of adjusting the brightness (or a resolution) of the display), applications operating in the external electronic device. According to an embodiment, the applications 370 may include applications (e.g., a health care application of a mobile medical appliance or the like) designated according to attributes of the external electronic device). According to an embodiment, the applications 370 may include an application received from an external electronic device. At least a part of the programming module 310 may be implemented (e.g., executed) in software, firmware, hardware (e.g., the processor 210), or a combination of two or more thereof. At least some of the program module 310 may include, for example, a module, a program, a routine, a set of instructions, or a process for performing one or more functions.

Figure 4:
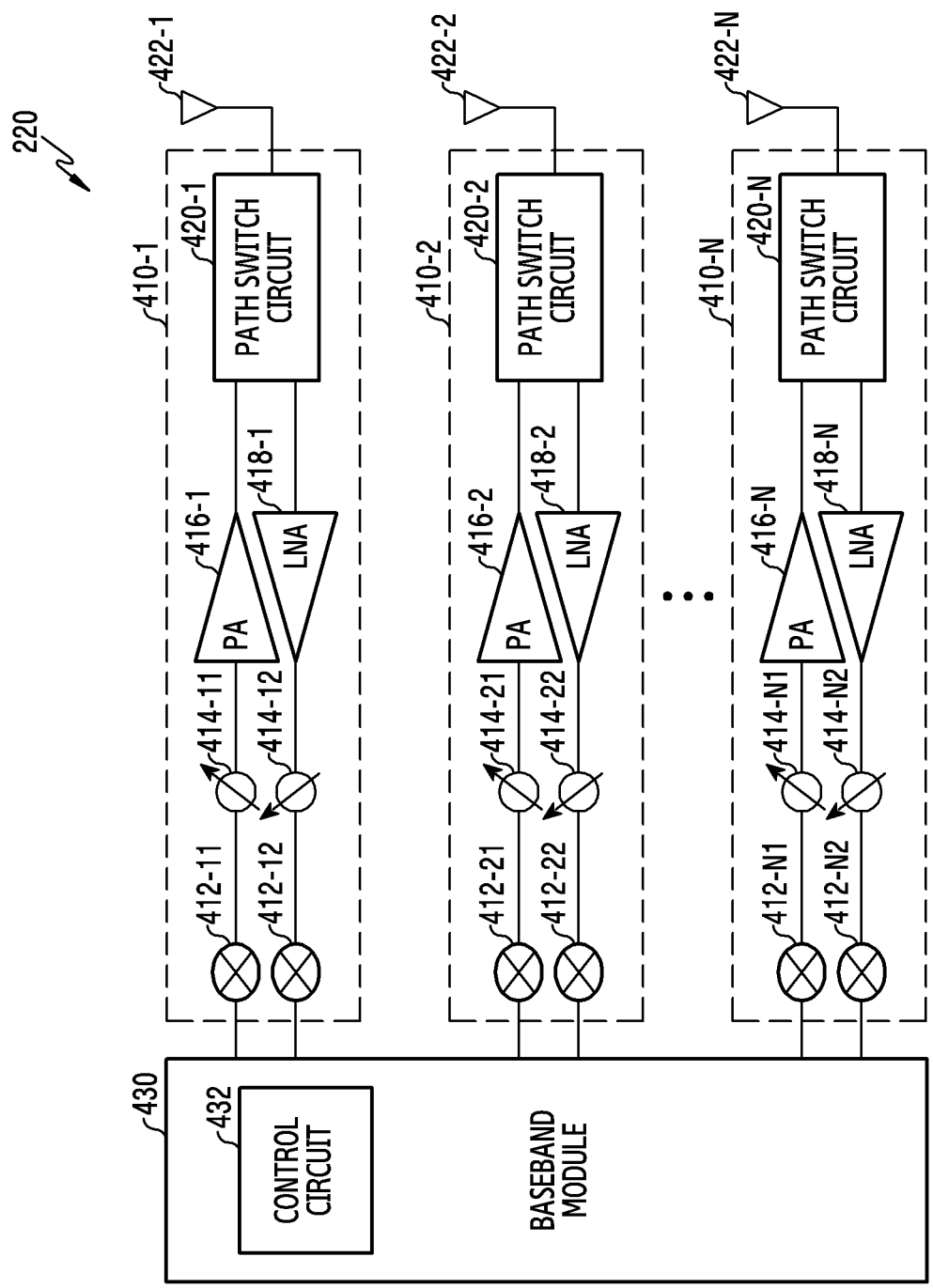
FIG. 4 illustrates a block diagram of a circuit for communication in an electronic device according to various embodiments of the disclosure.

FIG. 4 illustrates a block diagram of a circuit for communication in an electronic device according to various embodiments of the disclosure. The circuit for communication illustrated in FIG. 4 may be understood as an example of all or a part of the communication module 220 of FIG. 2.

Referring to FIG. 4, a circuit for communication according to an embodiment may include a plurality of transceiving paths 410-1 to 410-N, a plurality of antennas 422-1 to 422-N, and a baseband module 430. The transceiving path may be referred to as an RF chain.

According to an embodiment, the plurality of antennas 422-1 to 422-N may correspond to the plurality of transceiving paths 410-1 to 410-N, respectively. The plurality of antennas 422-1 to 422-N may include one or two or more antenna arrays. According to an embodiment, the plurality of antennas 422-1 to 422-N may be arranged at different positions, respectively. According to another embodiment, at least some of the plurality of antennas 422-1 to 422-N may include antennas having different polarizations and disposed at the same location.

According to an embodiment, a signal transmitted or a signal received through a corresponding antenna may be processed in each of the plurality of transceiving paths 410-1 to 410-N. According to an embodiment, the first transceiving path 410-1 may include a first mixer 412-11, a second mixer 412-12, and a first phase shifter 414-11, a second phase shifter 414-12, a power amplifier (PA) 416-1, a low noise amplifier (LNA) 418-1, and a path switch circuit 420-1. The first mixer 412-11 may perform an operation for raising a frequency band of a transmission signal to an RF band, and the first phase shifter 414-11 may change a phase of the transmission signal of the RF band. The PA 416-1 may amplify the transmission signal, and the LNA 418-1 may amplify a reception signal. The second phase shifter 414-12 may change a phase of the reception signal, and the second mixer 412-12 may perform an operation of lowering the frequency band of the reception signal to a baseband. For example, the first phase shifter 414-11 and the second phase shifter 414-12 may shift the phase of a signal according to a beamforming angle under the control of a processor (e.g., a communication processor).

Although not shown in FIG. 4, each of the first mixer 412-11 and the second mixer 412-12 may perform frequency band conversion of an input signal by using a frequency signal provided from a corresponding oscillator. The phase shifters 414-11, 414-21, and 414-N1 included in transmission paths may perform transmission beamforming by adjusting phases of signals passing through the transmission paths. The phase shifters 414-12, 414-22, and 414-N2 included in reception paths may perform reception beamforming by adjusting phases of signals passing through the reception paths.

The path switch circuit 420-1 may configure a signal path for calibration of the transmission path and reception path included in the first transceiving path 410-1. A configuration example and a path configuration operation of the path switch circuit 420-1 will be described in detail with reference to FIGS. 8A to 8H. The plurality of transceiving paths 410-1 to 410-N may be referred to as an "RF module", "RF integrated circuit (RFIC)", or other terms having the same technical meaning as those of the above-mentioned terms.

According to an embodiment, the baseband module 430 may perform operations for conversion between a baseband signal and a bit string according to a physical layer standard of a system. According to an embodiment, although not shown, the baseband module 430 may include a channel encoder/decoder, a modulator/demodulator, a digital to analog converter (DAC)/analog to digital converter (ADC), and the like. For example, when data transmission is performed, the baseband module 430 may generate complex symbols by encoding and modulating a transmission bit string. In addition, when data reception is performed, the baseband module 430 may restore a reception bit string by demodulating and decoding baseband signals provided from the plurality of transceiving paths 410-1 to 410-N. For example, according to an orthogonal frequency division multiplexing (OFDM) scheme, when data transmission is performed, the baseband module 430 may map complex symbols to subcarriers, and then may perform an inverse fast fourier transform (IFFT) operation and cyclic prefix (CP) insertion thereof, so as to generate OFDM symbols. In addition, when data reception is performed, the baseband module 430 may perform restoration of signals mapped to subcarriers, through a fast fourier transform (FFT) operation, and then may perform restoration of a reception bit string through demodulation and decoding.

According to an embodiment, the baseband module 430 may include the control circuit 432. The control circuit 432 may control operations, functions, and the like of the plurality of transceiving paths 410-1 to 410-N. According to an embodiment, the control circuit 432 may control connection states of the path switch circuits 420-1 to 420-N included in the plurality of transceiving paths 410-1 to 410-N. For example, the control circuit 432 may control the path switch circuits 420-1 to 420-N to be in one of two or more states. The two or more states may include at least one of a state of providing feedback relating to a transmission path, a state of connecting a transmission path and a reception path, a state of performing communication, and a path blocking state. Various states of the path switch circuits 420-1 to 420-N are described in detail with reference to FIGS. 8A to 8H below.

In an embodiment illustrated in FIG. 4, in the transceiving path 410-1, a path including the first mixer 412-11 and the PA 416-1 may be referred to as a transmission path, and a path including the LNA 418-1 and the second mixer 412-12 may be referred to as a reception path. According to another embodiment of the disclosure, the transmission path and the reception path may include two or more mixers and two or more amplifiers, as shown in an example of FIG. 5 below.

Figure 5:
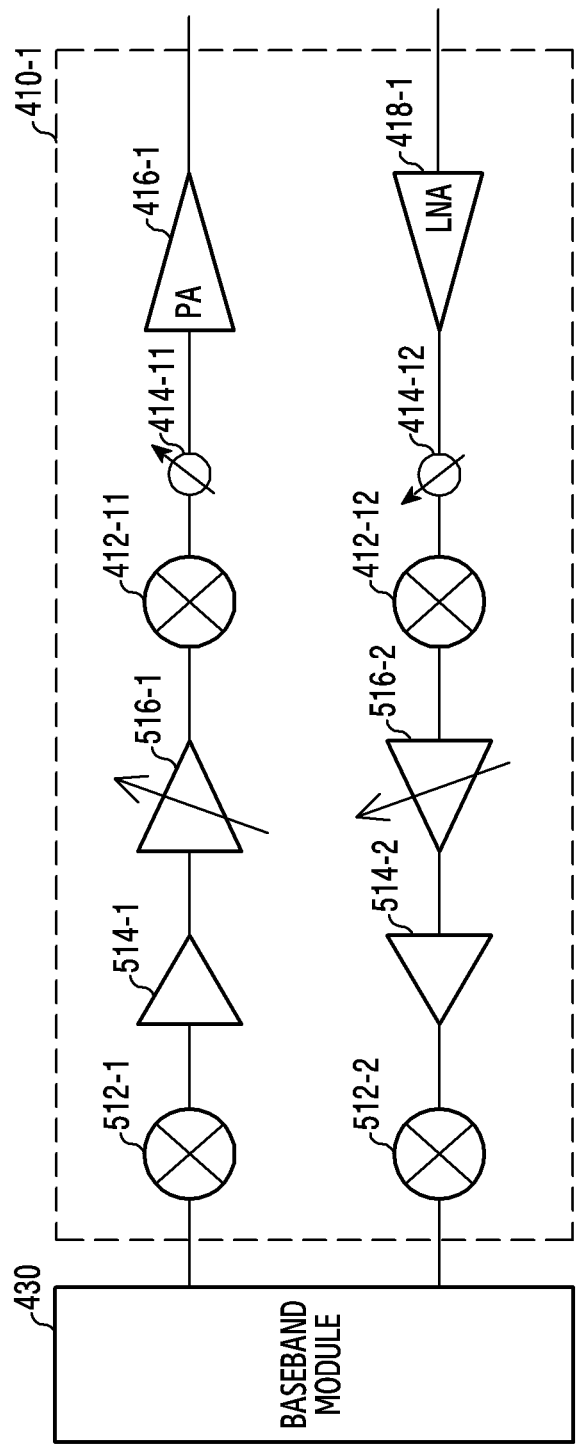
FIG. 5 is a block diagram illustrating a transmission path and a reception path in an electronic device according to various embodiments of the disclosure.

FIG. 5 is a block diagram illustrating a transmission path and a reception path in an electronic device according to various embodiments of the disclosure. Referring to FIG. 5, in a transmission path, a mixer 512-1 and amplifiers 514-1 and 516-1 may be further arranged between an output of the baseband module 430 and an input of the first mixer 412-11. The mixer 512-1 may up-convert a baseband signal to an intermediate frequency (IF) band signal, and the amplifiers 514-1 and 516-1 may amplify the IF band signal. In a reception path, amplifiers 514-2 and 516-2 and a mixer 512-2 may be further arranged between an output of the second mixer 412-12 and an input of the baseband module 430.

FIG. 5 illustrates a structure in which three amplifiers and two mixers are included in each of a transmission path and a reception path. According to various embodiments of the disclosure, each of the transmission path and the reception path may include three or any other number of amplifiers or two or any other number of mixers.

An electronic device according to an embodiment may include a transmission path, a reception path, a path switch circuit configured to configure a path for calibration of the transmission path and the reception path, and a control circuit configured to control the path switch circuit. The control circuit may configure a first path for a first calibration of the transmission path, perform the first calibration of the transmission path by using the first path, configure a second path for a second calibration of a transceiving path, perform the second calibration of the transceiving path by using the second path, and generate data indicating a result of calibration of a reception path, on the basis of a result obtained by the first calibration and the second calibration.

The first path according to an embodiment may be configured such that a signal output from the baseband module passes through the transmission path and is fed back to the baseband module through a part of the reception path.

The first path according to an embodiment may include an adjustment unit configured to adjust the magnitude of the signal having passed through the transmission path. The adjustment unit may include an attenuator or a coupler.

The reception path according to an embodiment may include at least one mixer and a low noise amplifier (LNA), and a part of the reception path may include a path from an output terminal of the LNA to an input terminal of the baseband module.

The reception path according to an embodiment may include at least one mixer and a low noise amplifier (LNA), and a part of the reception path may include a path from an input terminal of the LNA to an input terminal of the baseband module.

The second path according to an embodiment may be configured such that a signal output from the baseband module passes through the transmission path and is fed back to the baseband module through the reception path.

The control circuit according to an embodiment may perform, for a first calibration, measurement of signals having passed through the transmission path and a feedback path.

The control circuit according to an embodiment may perform, for a second calibration, measurement of signals having passed through the transmission path and the reception path.

The control circuit according to an embodiment may determine calibration result data for the reception path on the basis of data indicating a result of calibration of the transceiving path by using, as an offset, data indicating a result of the first calibration.

The control circuit according to an embodiment may perform control to connect the antenna to ground while the first calibration or the second calibration is being performed.

The control circuit according to an embodiment may perform the first calibration and the second calibration when the electronic device is firstly powered on, when a manual calibration command is generated, or when an event defined in relation to communication quality occurs. The event defined in relation to the communication quality may include radio link failure (RLF) having occurred a threshold number of times or more, or abnormal reset having occurred a threshold number of times or more.

Figure 6:
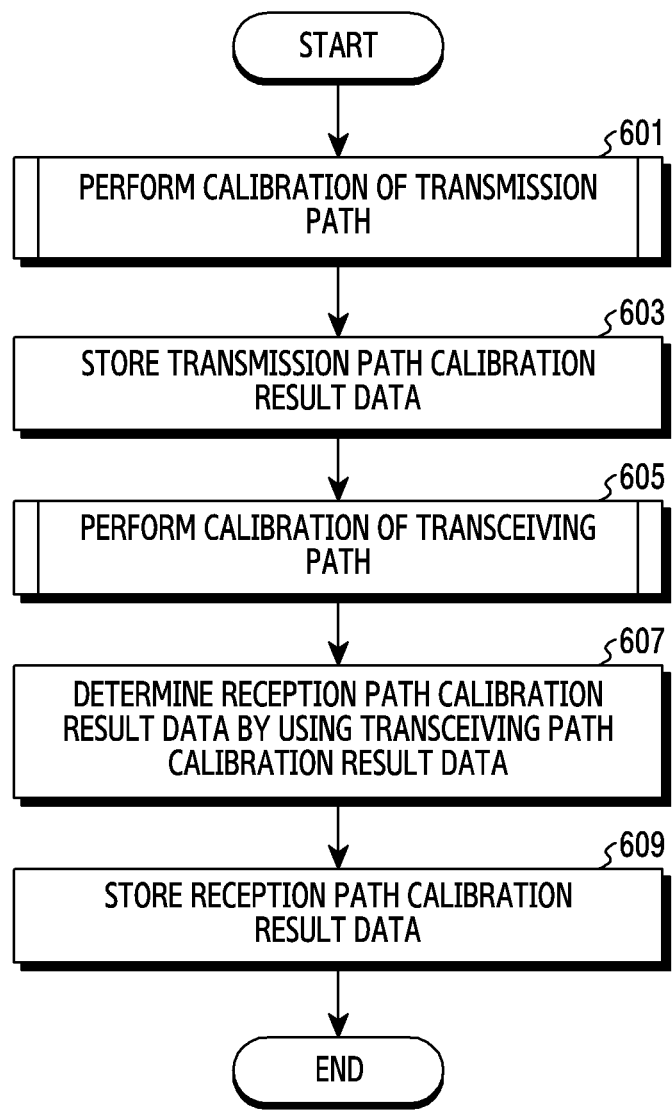
FIG. 6 is a flowchart illustrating performing calibration in an electronic device according to various embodiments.

FIG. 6 is a flowchart illustrating performing calibration of a transmission path and a reception path in an electronic device according to various embodiments. FIG. 6 illustrates an operation method of an electronic device (e.g., the control circuit 432).

Referring to FIG. 6, in operation 601, the control circuit 432 according to an embodiment may perform calibration of a transmission path. For example, the control circuit 432 may control an RF circuit (e.g., a path switch circuit 481-1) so that a feedback path relating to the transmission path is set, and perform calibration of the transmission path by using the feedback path. According to an embodiment, the control circuit 432 may measure power characteristics of a dynamic range for a transmission path, through the feedback path. According to an embodiment, the control circuit 432 may measure frequency characteristics of the transmission path. For example, the control circuit 432 may measure the magnitude change (e.g., power loss) and phase change characteristics of power-specific or frequency-specific signal of the transmission path.

In operation 603, the control circuit 432 according to an embodiment may store data indicating a result of calibration of a transmission path. For example, the data indicating the result of calibration of the transmission path may include at least one of information indicating the magnitude change of a signal and information indicating a phase change of the signal, occurring in the transmission path. As another example, data indicating a result of calibration of a transmission path may include magnitude or phase compensation values for a transmission signal. Information on the magnitude and the phase of a signal, included in data indicating a result of calibration of the transmission path, may be classified according to a frequency band or power. According to an embodiment, the control circuit 432 may store data indicating a result of calibration of the transmission path in a non-volatile (NV) region of a memory (e.g., the memory 230 or a memory (not shown) in the baseband module 430). Hereinafter, for convenience of explanation, data indicating the result of calibration may be referred to as "calibration result data".

In operation 605, the control circuit 432 according to an embodiment may perform calibration of a transceiving path. For example, the control circuit 432 may control an RF circuit (for example, the path switch circuit 420-1) so that a path for calibration of a transceiving path is set, and may perform calibration of the transceiving path by using the configured path. For example, a transceiving path may denote a path including a transmission path and a reception path (e.g., a path from an output of the baseband module 430 toward the transmission path, to an input to the baseband module 430 through the reception path). According to an embodiment, the control circuit 432 may measure, through a feedback path, power characteristics of a dynamic range for the transceiving path. According to an embodiment, the control circuit 432 may measure frequency characteristics of the transceiving path. For example, the control circuit 432 may measure the magnitude and phase change characteristics of a power-specific or frequency-specific signal of the transceiving path.

In operation 607, the control circuit 432 according to an embodiment may determine calibration result data for the reception path by using the calibration result data for the transceiving path. According to an embodiment, the control circuit 432 may determine calibration result data for the reception path, on the basis of the calibration result data for the transceiving path, by using as an offset the calibration result data for the transmission path stored in the nonvolatile region of the memory. According to an embodiment, the control circuit 432 may determine calibration result data for the reception path by calculating a difference between the calibration result data for the transceiving path and the calibration result data for the transmission path. For example, the control circuit 432 may acquire calibration result data for the reception path by using a power characteristic difference between the calibration result data for the transceiving path and the calibration result data for the transmission path and a frequency characteristic difference therebetween.

In operation 609, the control circuit 432 according to an embodiment may store reception path calibration result data. For example, the calibration result data for the reception path may include at least one of information indicating a signal magnitude change and information indicating a signal phase change, occurring in the reception path. As another example, the calibration result data for the reception path may include magnitude or phase compensation values for the reception signal. Information on the magnitude and the phase of a signal, included in the calibration result data for the reception path, may be classified according to a frequency band or power. According to an embodiment, the control circuit 432 may store the calibration result data for the reception path in a nonvolatile region of the memory (e.g., the memory 230 or a memory (not shown) in the baseband module 430).

An operation method of an electronic device according to an embodiment may include: configuring a first path for a first calibration of a transmission path; performing the first calibration of the transmission path by using the first path; configuring a second path for a second calibration of a transceiving path; performing the second calibration of the transceiving path by using the second path; and generating data indicating a result of calibration of a reception path, on the basis of a result obtained by the first calibration and the second calibration.

The performing of the first calibration according to an embodiment may include: performing measurement of signals having passed through the transmission path and a feedback path. An operation method of an electronic device according to an embodiment may further include: reducing the magnitude of the signals before being input to the feedback path.

The performing of the second calibration according to an embodiment may include performing measurement of signals having passed through the transmission path and the reception path.

The generating of the data indicating a result of calibration of the reception path according to an embodiment may include: determining calibration result data for the reception path on the basis of data indicating a result of calibration of the transceiving path by using, as an offset, data indicating a result of the first calibration.

An operation method of an electronic device according to an embodiment may further include: performing control to connect an antenna to ground while the first calibration or the second calibration is being performed.

The first calibration and the second calibration according to an embodiment may be performed when the electronic device is firstly powered on, when a manual calibration command is generated, or when an event defined in relation to communication quality occurs.

As in the embodiment described with reference to FIG. 6, an electronic device (for example, the electronic device 101 and the electronic device 201) may perform calibration of a transmission path and a transceiving path using an internal circuit, and then derive calibration result data for a reception path from calibration result data for the transmission path and the transceiving path. Accordingly, the electronic device may perform calibration without using external measurement equipment. Hereinafter, examples of a circuit structure of a transceiving path for calibration according to various embodiments of the disclosure will be described in more detail.

Figure 7A:
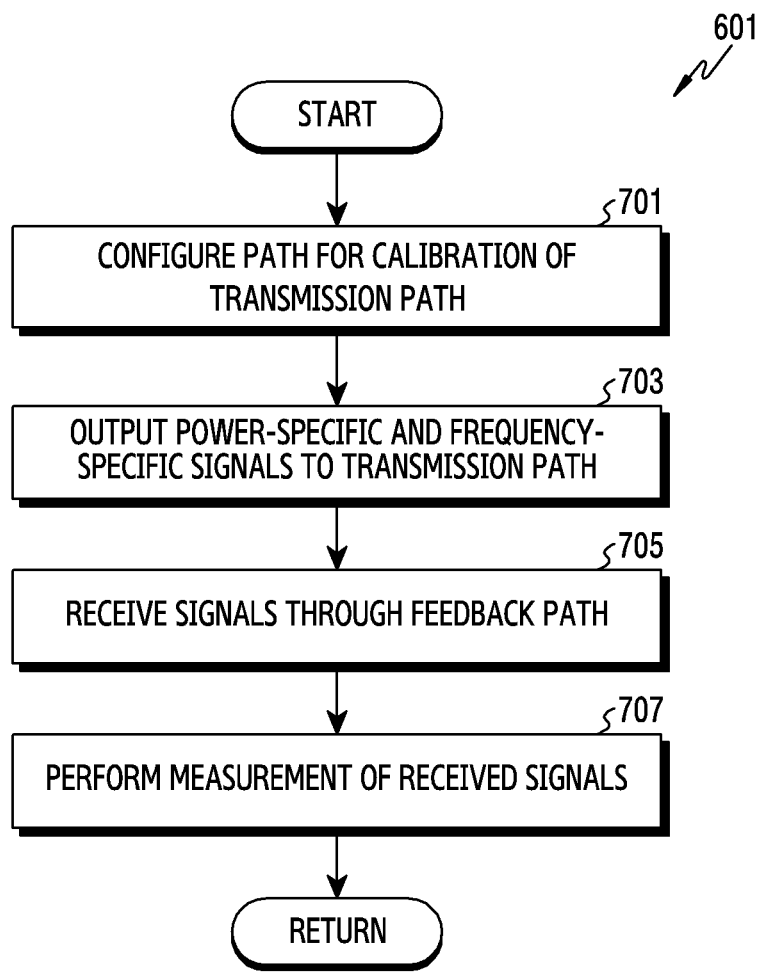
FIG. 7A is a flowchart illustrating performing calibration of a transmission path in an electronic device according to various embodiments.

FIG. 7A is a flowchart illustrating performing calibration of a transmission path in an electronic device according to various embodiments of the disclosure. FIGS. 8A to 8H illustrate examples of circuits enabling path switching for calibration in an electronic device according to various embodiments of the disclosure. FIG. 7A illustrates detailed operations of operation 601 of FIG. 6.

Referring to FIG. 7A, in operation 701, the control circuit 432 according to an embodiment may configure a path for calibration of a transmission path. For example, the control circuit 432 may configure a path such that a signal output from the baseband module 430 passes through the transmission path and is fed back to the baseband module 430 through a part of the reception path. According to an embodiment, in order to configure a path, the control circuit 432 may control a connection state between one or mode nodes included in the path switch circuit 420-1.

For example, as shown in FIGS. 8A to 8H, the path switch circuit 420-1 may include at least one of the plurality of nodes 812-1 to 812-8. Referring to FIGS. 8A to 8H, a first node 812-1 is an end node facing an antenna of a transmission path, a second node 812-2 is a node for separating a transmission path, and a third node 812-3 is a node for inputting a signal having passed through the transmission path to the feedback path, and a fourth node 812-4 is an end node facing an antenna of the reception path. A fifth node 812-5 is a node for providing, to the baseband module 430, a signal having passed through the feedback path or the reception path, a sixth node 812-6 is a node for inputting to the reception path the signal having passed through the feedback path, and a seventh node 812-7 is a node for outputting the signal having passed through the reception path. An eighth node 812-8 is a node for grounding a transmission path, and a ninth node 812-9 is a node for grounding an antenna. According to various embodiments, the eighth node 812-8 and the ninth node 812-9 may be omitted.

Figure 8A:
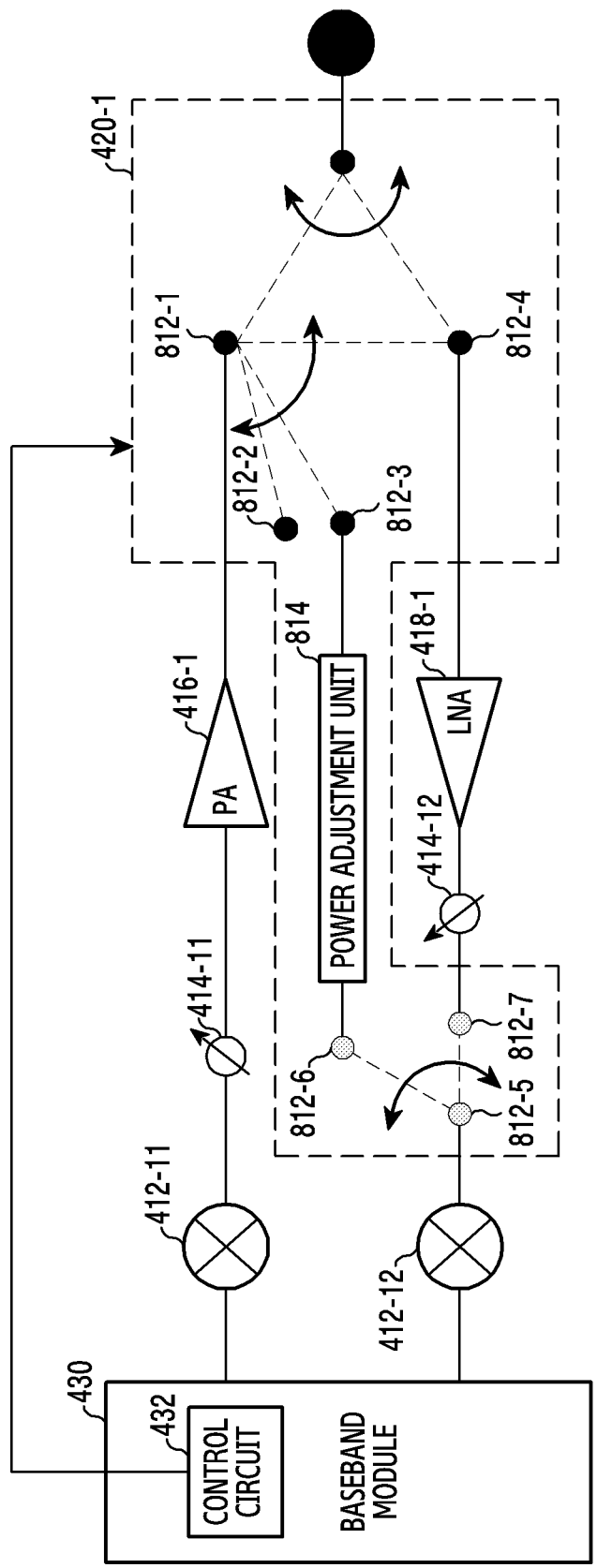
FIGS. 8A to 8H illustrate examples of circuits enabling path switching for calibration in an electronic device according to various embodiments.
Figure 8B:
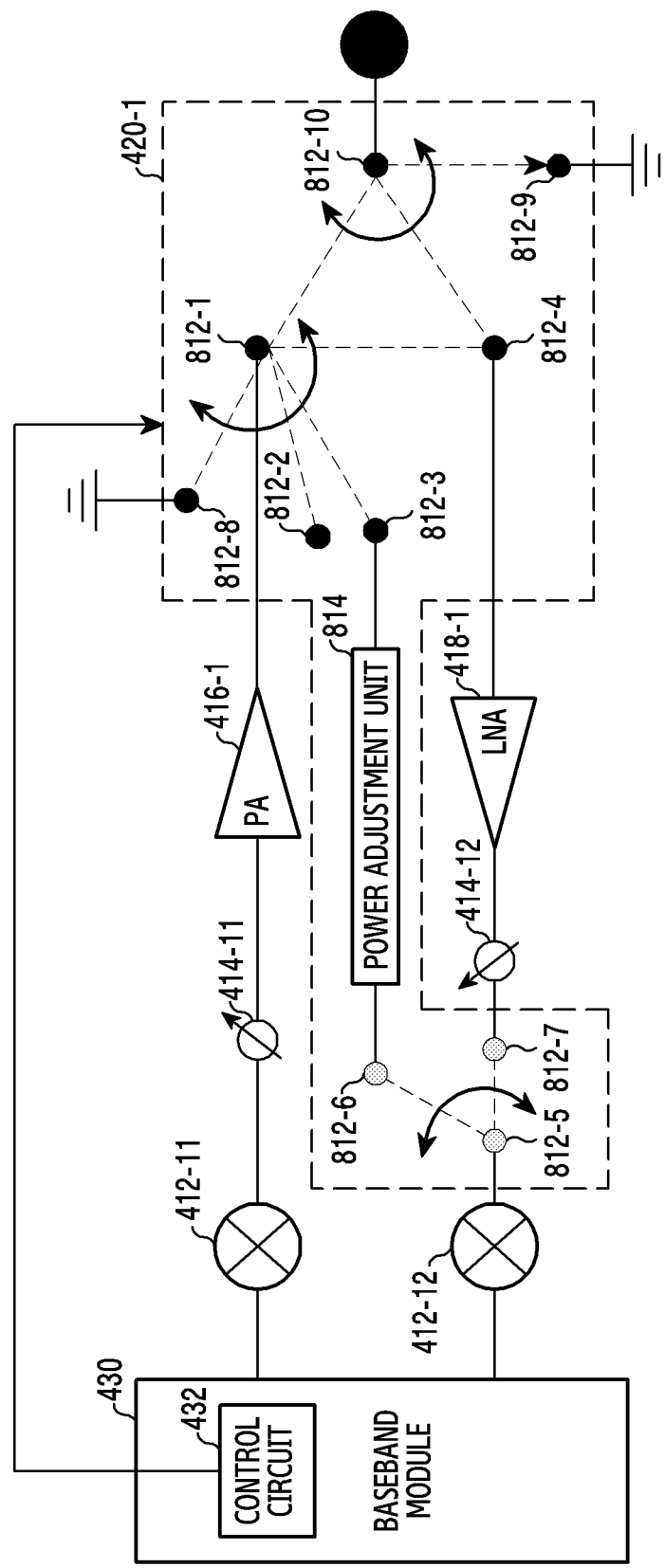
Figure 8C:
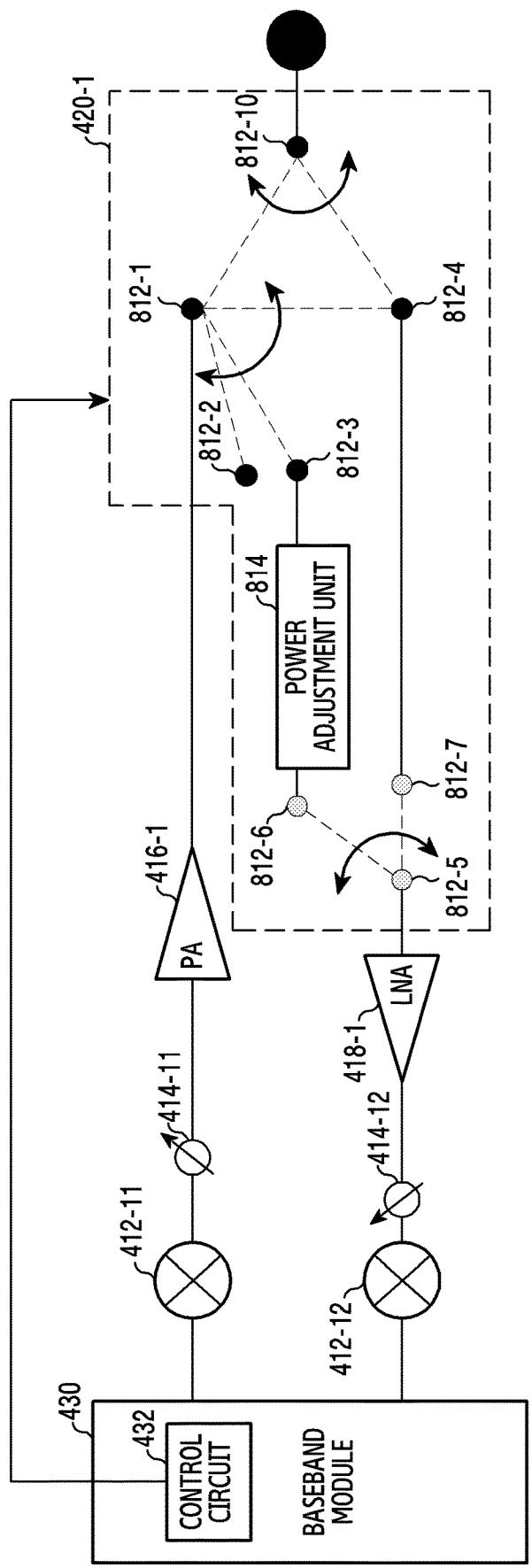
Figure 8D:
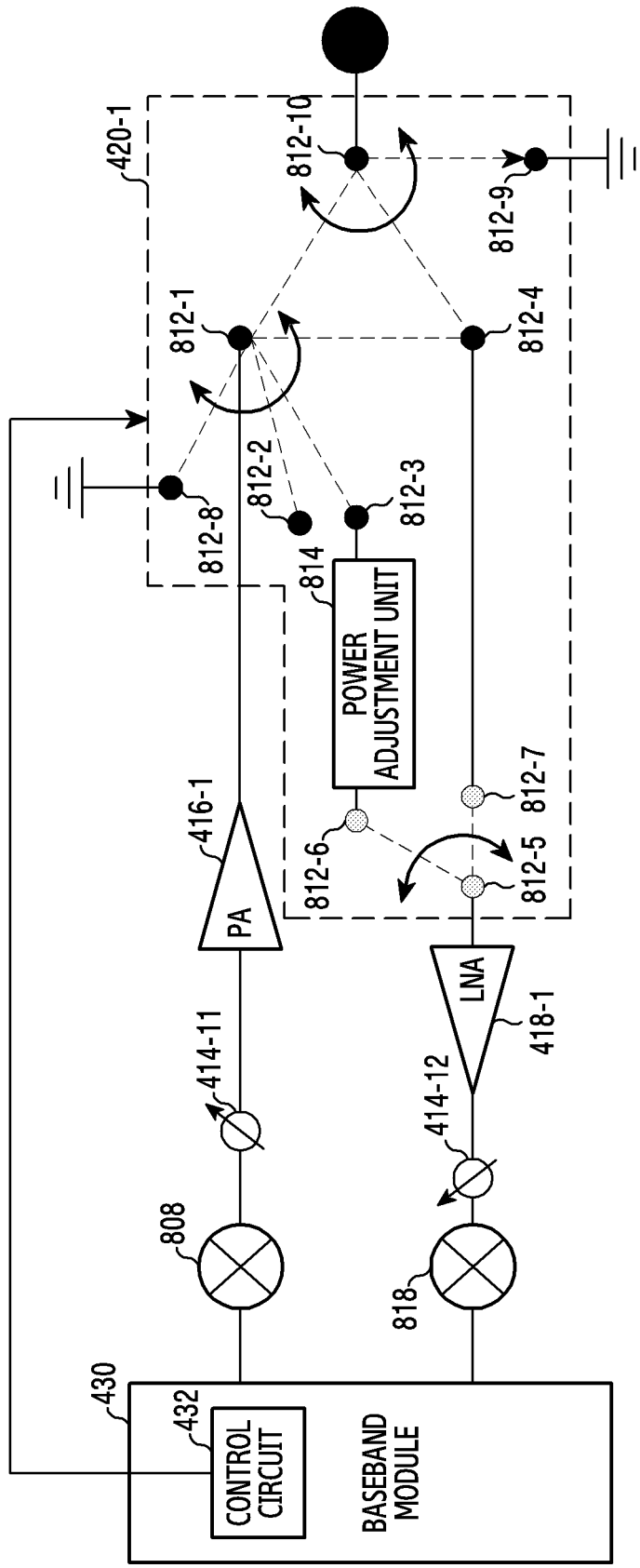
Figure 8E:
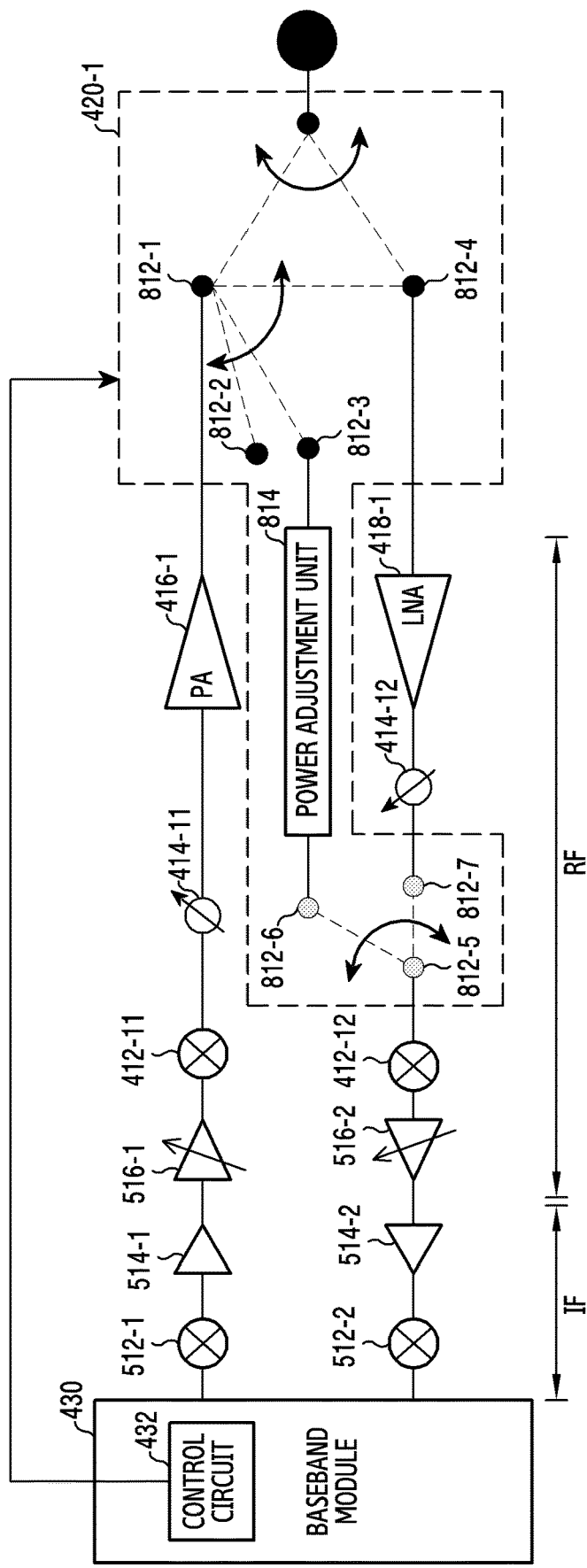
Figure 8F:
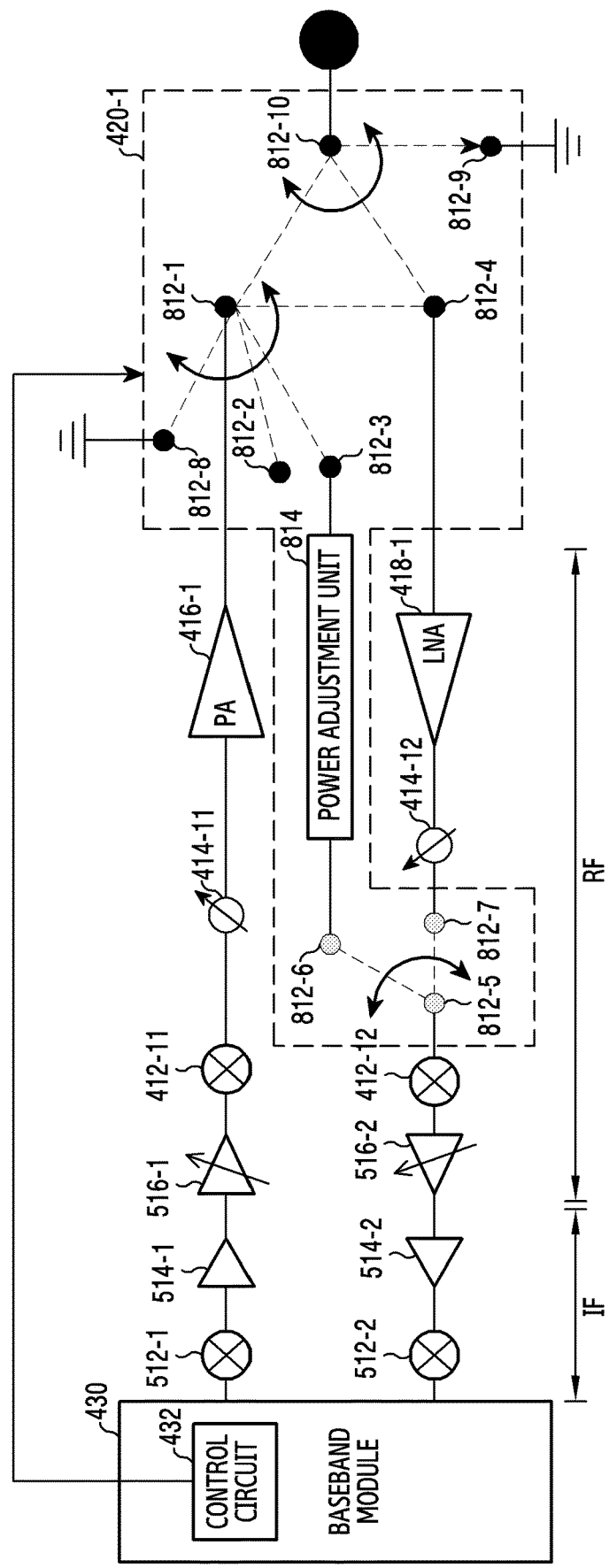
Figure 8G:
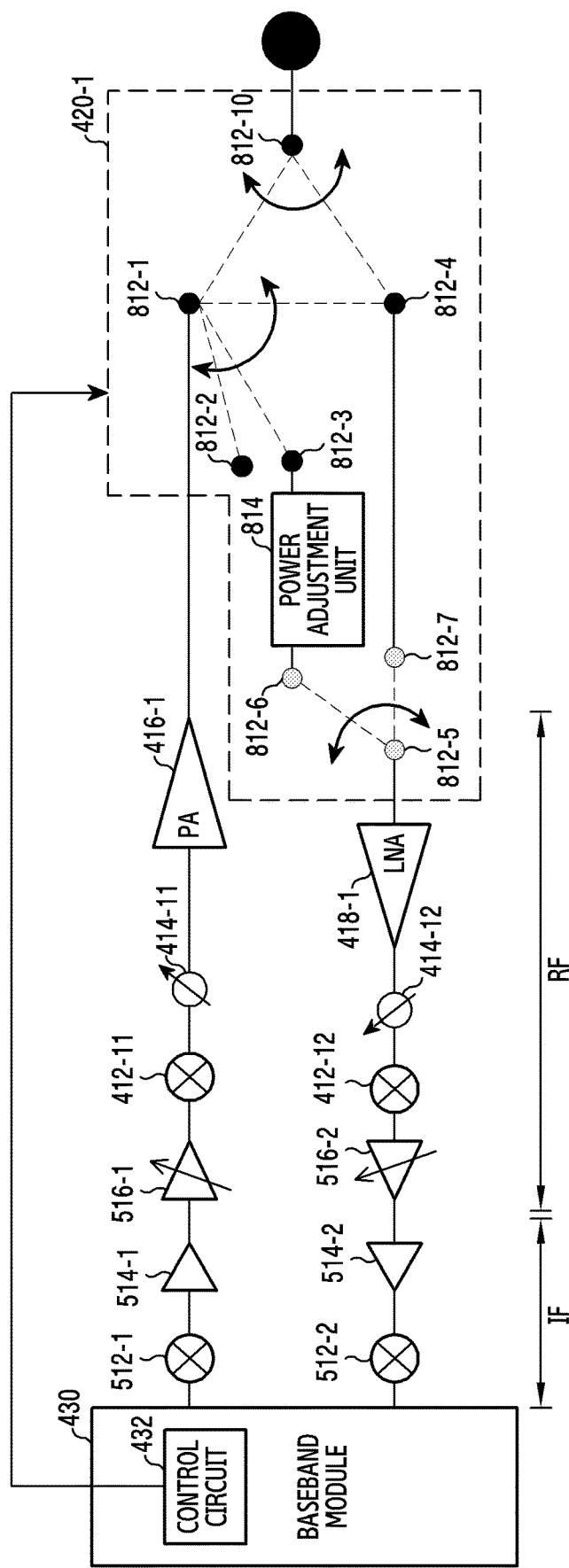
Figure 8H:
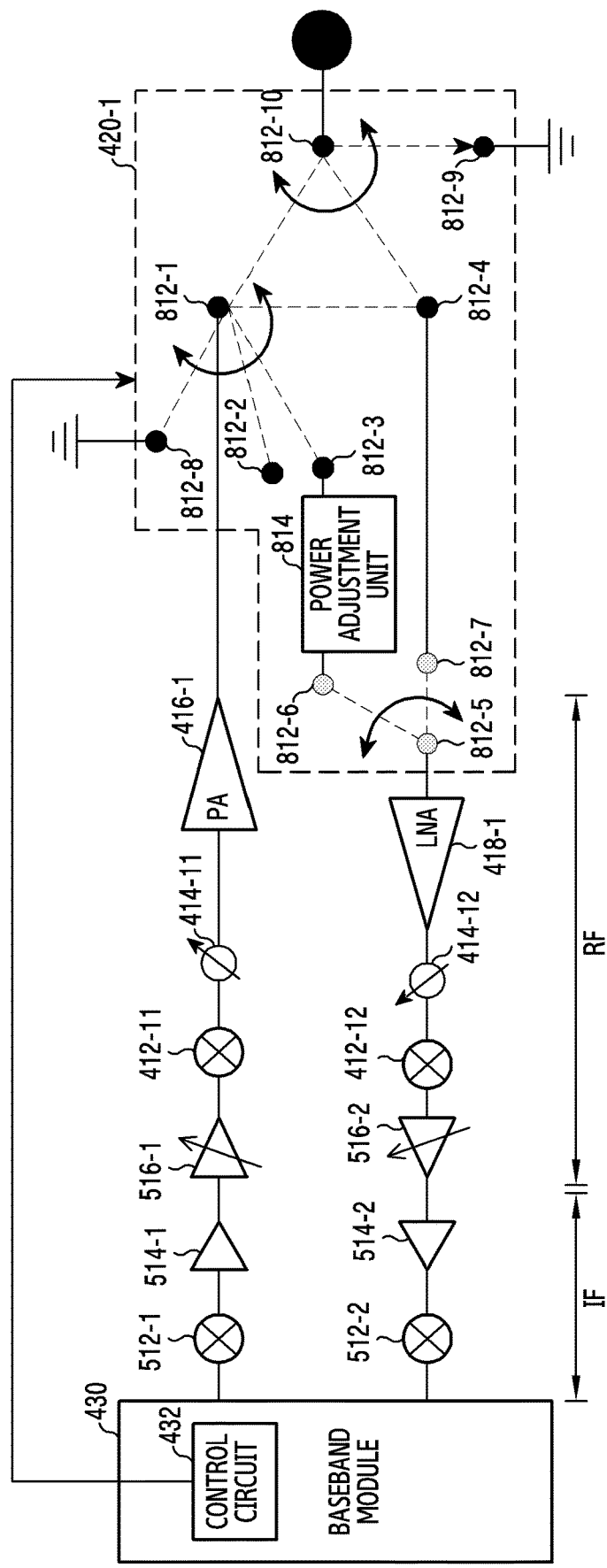

According to an embodiment, when the path switch circuit 420-1 is implemented as shown in one of FIGS. 8A to 8H, the control circuit 432 may perform control such that a first node 812-1 firstly connected to a second node 812-2 is connected to a third node 812-3, and may perform control such that a fifth node 812-5 and a sixth node 812-6 are connected to each other. As another example, when the path switch circuit 420-1 is implemented as shown in FIG. 8B or FIG. 8H, the control circuit 432 may perform control such that a tenth node 812-10 connected to an antenna is connected to a ninth node 812-9 connected to ground, in order to prevent a malfunction due to a connection to an antenna port.

In operation 703, the control circuit 432 according to an embodiment may output power-specific and frequency-specific signals to the transmission path. For example, the control circuit 432 may control the baseband module 430 to sweep a plurality of signals having different powers and different frequency bands. For example, the powers and frequency bands of the signals may be determined based on a system specification and hardware characteristics of an electronic device.

In operation 705, the control circuit 432 according to an embodiment may receive signals through a feedback path. The plurality of signals output to the transmission path in operation 703 may pass through the transmission path, and then may be received through a feedback path including the first node 812-1, the third node 812-3, a power adjustment unit 814, the sixth node 812-6, and the fifth node 812-5. The power adjustment unit 814 is an element for adjusting a signal amplified by the PA 440-1 to a signal having a magnitude that can be processed in a reception path, and may be implemented by an attenuator or a coupler.

In operation 707, the control circuit 432 according to an embodiment may perform measurement of received signals. For example, the control circuit 432 may detect the magnitude and the phase of the received signals. The control circuit 432 may measure the signal magnitude and phase changes due to the transmission path, by comparing the magnitude and phase of signals at the time of transmission thereof with the magnitude and phase after the signals are received. According to an embodiment, when the path switch circuit 420-1 is implemented as shown in FIG. 8B or FIG. 8H, while operation 707 is being performed, the control circuit 432 may perform control to connect the first node 812-1 to the eighth node 812-8 connected to the ground.

Figure 7B:
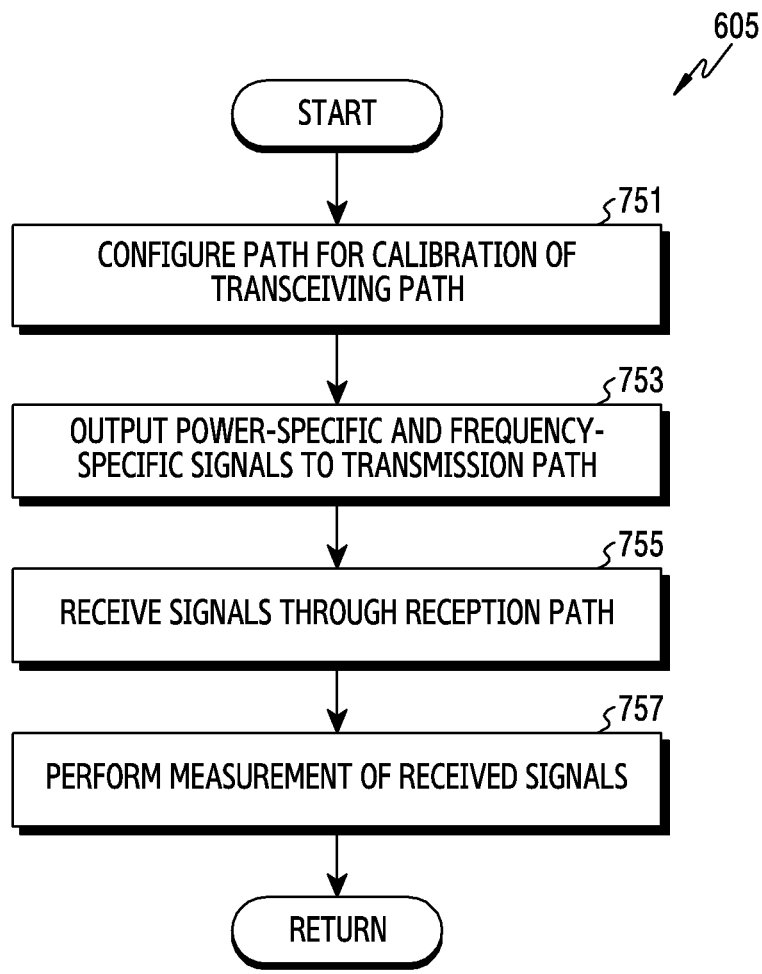
FIG. 7B is a flowchart illustrating performing calibration of a transceiving path in an electronic device according to various embodiments.

FIG. 7B is a flowchart illustrating performing calibration of a transceiving path in an electronic device according to various embodiments of the disclosure. FIGS. 8A to 8H illustrate examples of circuits enabling path switching for calibration in an electronic device according to various embodiments. FIG. 7B illustrates detailed operations of operation 605 of FIG. 6.

Referring to FIG. 7, in operation 751, the control circuit 432 according to an embodiment may configure a path for calibration of a transceiving path. According to an embodiment, in order to configure a path, the control circuit 432 may control a connection state between one or more nodes included in the path switch circuit 420-1. For example, when the path switch circuit 420-1 is implemented as shown in one of FIGS. 8A to 8H, the control circuit 432 may perform control such that the first node 812-1 and the fourth node 812-4 are connected to each other, and may perform control such that the fifth node 812-5 and the seventh node 812-7 are connected to each other. As another example, when the path switch circuit 420-1 is implemented as shown in FIG. 8B or FIG. 8H, the control circuit 432 may perform control such that the tenth node 812-10 connected to the antenna is connected to the ninth node 812-9 connected to the ground, in order to prevent a malfunction due to the connection to the antenna port.

In operation 753, the control circuit 432 according to an embodiment may output power-specific and frequency-specific signals to a transmission path. For example, the control circuit 432 may control the baseband module 430 to sweep a plurality of signals having different powers and different frequency bands. For example, the powers and frequency bands of the signals may be determined based on a system specification and hardware characteristics of an electronic device.

In operation 755, the control circuit 432 according to an embodiment may receive signals through a reception path. The plurality of signals output to the transmission path in operation 703 may pass through the transmission path and then input to the reception path through a return path including the first node 812-1 and the fourth node 812-4, and may be received by the baseband module 430 through the reception path.

In operation 757, the control circuit 432 according to an embodiment may perform measurement on received signals. For example, the control circuit 432 may detect the magnitude and phase of the received signals. The control circuit 432 may measure the signal magnitude and phase changes due to the transceiving path, by comparing the magnitude and phase of the signals at the time of transmission thereof with the magnitude and phase after the signals are received. According to an embodiment, when the path switch circuit 420-1 is implemented as shown in FIG. 8B or FIG. 8H, while operation 757 is being performed, the control circuit 432 may perform control such that the first node 812-1 is connected to the eighth node 812-8 connected to the ground.

As in the embodiments described with reference to FIGS. 7A and 7B, by controlling a circuit inside the transceiving path, a feedback path or return path for calibration may be set. In addition, when the path switch circuit 420-1 is implemented as shown in FIG. 8B or FIG. 8H, an error caused by an antenna during a calibration operation may be prevented due to the ninth node 812-9 connected to the ground. In addition, when the path switch circuit 420-1 is implemented as shown in FIG. 8B or FIG. 8H, during measurement of a signal having passed through a path for calibration, the first node 812-1 is controlled to be connected to the eighth node 812-8, thereby preventing an error occurrence due to a path for calibration.

In examples shown in FIGS. 8A to 8H, an output terminal of the PA 416-1 and an input terminal of the LNA 418-1 may be connected to an antenna. According to another embodiment of the disclosure, at least one element may be disposed between an output terminal of the PA 416-1, an input terminal of the LNA 418-1, and the antenna.

In the examples shown in FIGS. 8A and 8B, a feedback path may be connected to the output terminal of the LNA 418-1. According to another embodiment of the disclosure, the feedback path may be connected to another node in the reception path, for example, an output terminal of a mixer, an output terminal of another amplifier, or an input terminal of the baseband module 430.

The example shown in FIGS. 8A to 8D may be understood as a circuit structure in which a signal input to and output from the baseband module 430 is directly converted into a signal of an RF band. According to another embodiment, examples shown in FIGS. 8E to 8H may be understood as a circuit structure in which a signal input to and output from the baseband module 430 passes through an IF band and then is directly converted into a signal of an RF band.

The calibration operation according to various embodiments described above may be performed when an electronic device (for example, the electronic device 101 and the electronic device 201) is manufactured. Alternatively, the calibration operation according to various embodiments described above may be performed while the electronic device is being used by a user. Hereinafter, various embodiments relating to a time point at which calibration operation is performed will be described.

Figure 9:
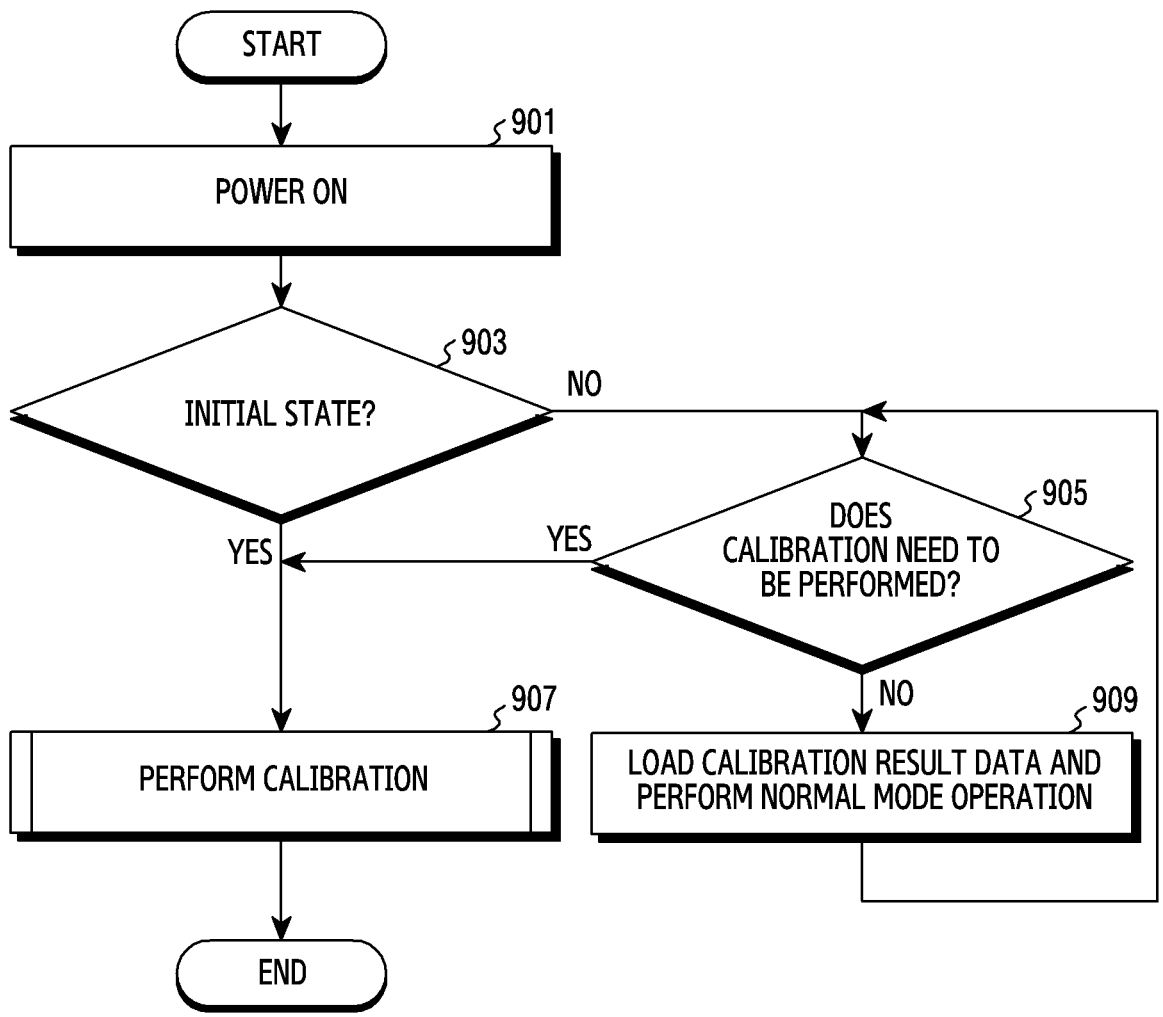
FIG. 9 is a flowchart illustrating performing calibration according to a situation in an electronic device according to various embodiments.

FIG. 9 is a flowchart illustrating performing calibration according to a situation in an electronic device according to various embodiments. FIG. 6 illustrates an operation method of an electronic device (e.g., the electronic device 101 and the electronic device 201).

Referring to FIG. 9, in operation 901, an electronic device according to an embodiment may transit to a power-on state. The transition to the power-on state may be performed according to the user's pressing of a power button. For example, a power management module (e.g., the power management module 295) supplies power to internal elements of the electronic device, and a processor (e.g., the processor 210) may perform a booting procedure. Accordingly, the control circuit 432 may operate.

In operation 903, the control circuit 432 according to an embodiment may determine whether an electronic device is in an initial state. For example, the control circuit 432 may determine whether the electronic device is transitioned to the first power-on state after being shipped from the factory. For example, the control circuit 432 may determine whether calibration is performed or not. For example, the control circuit 432 may determine whether calibration result data is stored or not. If the electronic device is not in the initial state, in operation 905, the control circuit 432 according to an embodiment may determine whether calibration needs to be performed. For example, the control circuit 432 determines whether calibration needs to be performed, based on at least one of deterioration of communication quality (e.g., an occurrence of radio link failure (RLF), an occurrence of abnormal reset, sudden increase in a data error rate, etc.) and manual operation.

If the electronic device is in the initial state or if the electronic device is not in the initial state but calibration thereof needs to be performed, in operation 907, the control circuit 432 according to an embodiment may perform calibration. For example, the control circuit 432 may perform calibration of a transmission path, store calibration result data for the transmission path, perform calibration of a transceiving path, and determine and store calibration result data for a reception path. According to an embodiment, the control circuit 432 may perform calibration according to an embodiment illustrated in FIG. 6.

If the electronic device is not in the initial state and there is no need to perform calibration, in operation 909, the control circuit 432 according to an embodiment may load calibration result data, and may operate in a normal mode. For example, the control circuit 432 may pre-compensate or post-correct the magnitude and phase of a signal transmitted or received through a transceiving path of a corresponding antenna by using the calibration result data. When operation 909 is completed, the control circuit 432 may return to operation 905 to determine whether it is necessary to perform calibration.

As an embodiment illustrated in FIG. 9, calibration according to various embodiments may be performed when an electronic device is in an initial state or as necessary during operation. Since calibration according to various embodiments does not require an external measuring device, the calibration may be performed during operation. Hereinafter, embodiments of the calibration performed during operation will be described in more detail.

Figure 10:
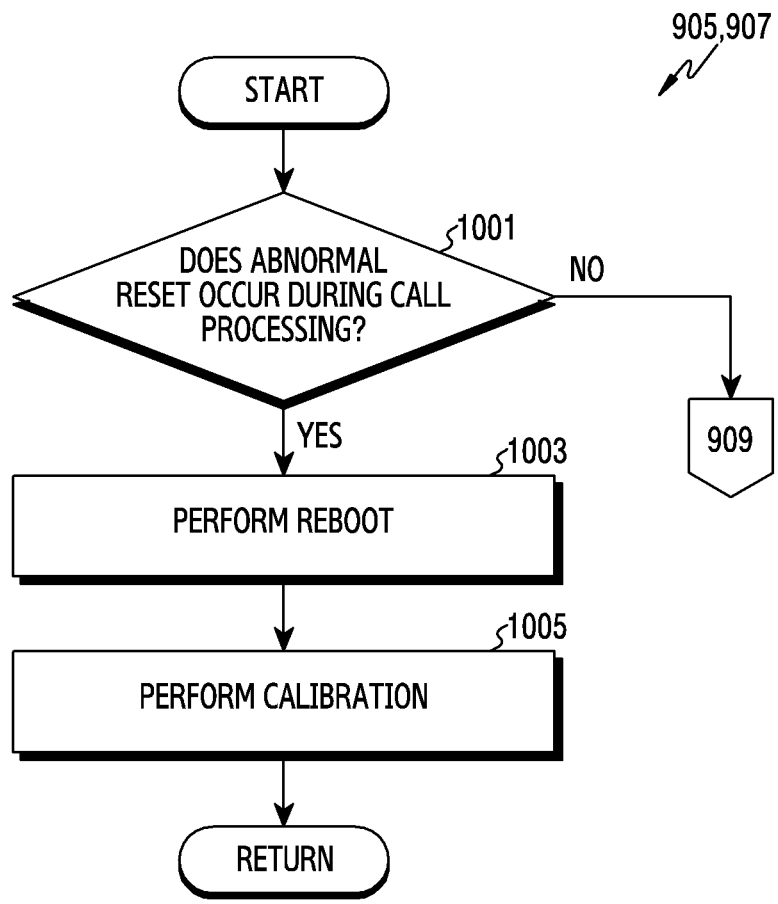
FIG. 10 is a flowchart illustrating performing calibration according to an abnormal reset in an electronic device according to various embodiments.

FIG. 10 is a flowchart illustrating performing calibration according to an abnormal reset in an electronic device according to various embodiments. FIG. 10 illustrates an operation method of an electronic device (for example, the electronic device 101 and the electronic device 102).

Referring to FIG. 10, in operation 1001, the control circuit 432 according to an embodiment may check whether an abnormal reset occurs during a call processing procedure. For example, during processing of an incoming call or an outgoing call, the control circuit 432 may determine whether an abnormal reset event occurs. For example, the abnormal reset event may include a case where power of an electronic device is turned off in a way that is not normal (for example, a case where the power is turned off without pressing a power button).

When an abnormal reset occurs, in operation 1003, an electronic device (e.g., the processor 210) according to an embodiment may perform a reboot. The processor 210 may turn on power and perform a boot operation.

In operation 1005, the control circuit 432 according to an embodiment may perform calibration. According to an embodiment, the control circuit 432 may perform calibration according to an embodiment illustrated in FIG. 6. FIG. 10 illustrates that calibration is performed after rebooting is completed, but according to another embodiment, calibration may be performed during a reboot operation. According to another embodiment of the disclosure, operation 1005 may be performed in the case where an abnormal reset has occurred a threshold number of times or more.

Figure 11:
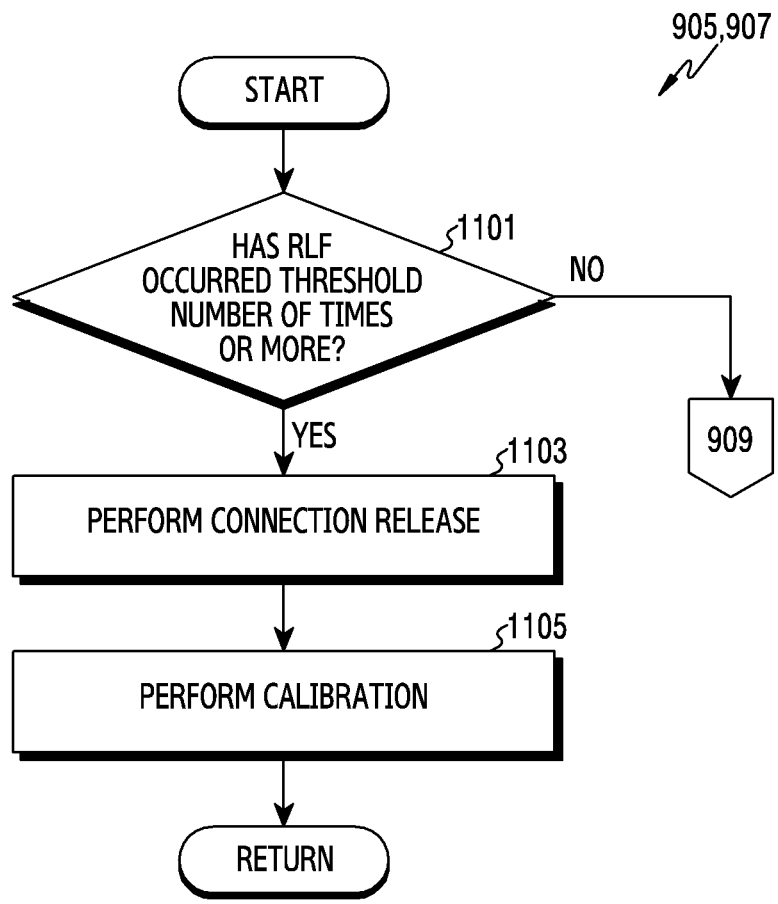
FIG. 11 illustrates a flowchart illustrating performing calibration according to occurrence of a radio link failure (RLF) in an electronic device according to various embodiments.

FIG. 11 is a flowchart illustrating performing calibration according to an RLF in an electronic device according to various embodiments. FIG. 11 illustrates an operation method of an electronic device (e.g., the electronic device 101 and the electronic device 102).

Referring to FIG. 11, in operation 1101, the control circuit 432 according to an embodiment may determine whether RLFs have occurred a threshold number of times or more. For example, the number of times of occurrence of the RLF may be counted within a certain time duration, and may be notified of by another element (e.g., the processor 210).

If RLFs have occurred a threshold number of times or more, in operation 1103, the processor 210 according to an embodiment may process a connection release. For example, the processor 210 may perform signaling for releasing a connection from a network, and may release an allocated resource (e.g., a bearer allocated from the network, identification information of an electronic device, which is allocated from the network, etc.).

In operation 1105, the control circuit 432 according to an embodiment may perform calibration. According to an embodiment, the control circuit 432 may perform calibration according to an embodiment illustrated in FIG. 6.

Figure 12:
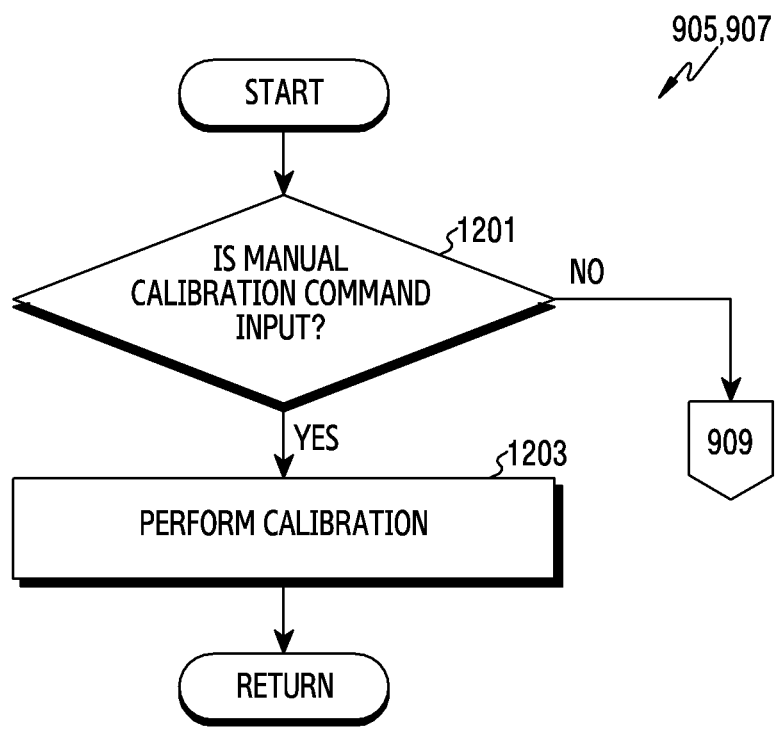
FIG. 12 is a flowchart illustrating performing calibration according to a manual operation in an electronic device according to various embodiments.

FIG. 12 is a flowchart illustrating performing calibration according to a manual operation in an electronic device according to various embodiments. FIG. 12 illustrates an operation method of an electronic device (e.g., the electronic device 101 and the electronic device 102).

Referring to FIG. 12, in operation 1201, the control circuit 432 according to an embodiment may determine whether a manual calibration command is input. For example, the manual calibration command may be generated by a soft key input or a specific hard key input. For example, the manual calibration command may be input during an inspection of an electronic device in a service center, and may be input according to a user's determination.

If the manual calibration command is input, in operation 1203, the control circuit 432 according to an embodiment may perform calibration. According to an embodiment, the control circuit 432 may perform calibration according to an embodiment illustrated in FIG. 6.

The term "module" as used herein may, for example, include a unit configured by hardware, software, or firmware. The "module" may be interchangeably used with, for example, the term "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), or a programmable-logic device for performing operations which has been known or are to be developed hereinafter. According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130. The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa. Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operation method of an electronic device, the operation method comprising:
configuring a first path for a first calibration of a transmission path;
performing the first calibration of the transmission path by using the first path;
configuring a second path for a second calibration of a transceiving path;
performing the second calibration of the transceiving path by using the second path; and
generating data indicating a result of calibration of a reception path, on the basis of a result obtained by the first calibration and the second calibration.

2. The operation method of claim 1, wherein performing of the first calibration comprises performing measurement of signals having passed through the transmission path and a feedback path.

3. The operation method of claim 2, further comprising reducing a magnitude of the signals before being input to the feedback path.

4. The operation method of claim 1, wherein performing of the second calibration comprises performing measurement of signals having passed through the transmission path and the reception path.

5. The operation method of claim 1, wherein generating of the data indicating a result of calibration of the reception path comprises: determining calibration result data for the reception path on the basis of data indicating a result of calibration of the transceiving path by using, as an offset, data indicating a result of the first calibration.

6. The operation method of claim 1, further comprising performing control such that an antenna is connected to ground while the first calibration or the second calibration is being performed.

7. The operation method of claim 1, wherein the first calibration and the second calibration are performed when the electronic device is firstly powered on, when a manual calibration command is generated, or when an event defined in relation to communication quality occurs.

8. An electronic device comprising:
a transmission path;
a reception path;
a path switch circuit configured to configure a path for calibration of the transmission path and the reception path; and
a control circuit configured to control the path switch circuit,
wherein the control circuit is configured to:
configure a first path for a first calibration of the transmission path,
perform the first calibration of the transmission path by using the first path,
configure a second path for a second calibration of a transceiving path;
perform the second calibration of the transceiving path by using the second path; and
generate data indicating a result of calibration of a reception path, on the basis of a result obtained by the first calibration and the second calibration.

9. The electronic device of claim 8, wherein the first path is configured such that a signal output from a baseband module passes through the transmission path, and is fed back to the baseband module through a part of the reception path.

10. The electronic device of claim 9, wherein the first path comprises an adjustment unit configured to adjust a magnitude of the signal having passed through the transmission path.

11. The electronic device of claim 10, wherein the adjustment unit comprises an attenuator or a coupler.

12. The electronic device of claim 9, wherein the reception path comprises at least one mixer and a low noise amplifier (LNA), and
a part of the reception path includes a path from an output terminal of the LNA to an input terminal of the baseband module.

13. The electronic device of claim 9, wherein the reception path comprises at least one mixer and a low noise amplifier (LNA), and
a path from an input terminal of the LNA to an input terminal of the baseband module.

14. The electronic device of claim 8, wherein the second path is configured such that a signal output from the baseband module passes through the transmission path, and is fed back to the baseband module through the reception path.

15. The electronic device of claim 8, wherein the control circuit performs control to:
for the first calibration, perform measurement of signals having passed through the transmission path and a feedback path.

16. The electronic device of claim 8, wherein the control circuit determines calibration result data for the reception path on the basis of data indicating a result of calibration of the transceiving path by using, as an offset, data indicating a result of the first calibration.

17. The electronic device of claim 8, wherein the control circuit is configured to perform the first calibration and the second calibration when the electronic device is firstly powered on, when a manual calibration command is generated, or when an event defined in relation to communication quality occurs.

18. The electronic device of claim 17, wherein, the event defined in relation to the communication quality includes radio link failure (RLF) having occurred a threshold number of times or more, or abnormal reset having occurred a threshold number of times or more.

19. The electronic device of claim 8, wherein the control circuit performs control to:
for the second calibration, perform measurement of signals having passed through the transmission path and the reception path.

20. The electronic device of claim 8, wherein the control circuit performs control to:
connect the antenna to ground while the first calibration or the second calibration is being performed.

* * * * *